Patented June 4, 1940

2,203,339

UNITED STATES PATENT OFFICE 2,203,339

ABIETYL SULPHATE AND PROCESS FOR ITS MANUFACTURE

Howard Maurice Parmelee, Salem, N. J., assignor to E. I. du Pont de Nemours & Company, Wilmington, Del., a corporation of Delaware No Drawing. Application May 11, 1937,
Serial No. 141,929

13 Claims. (Cl. 260—100)

This invention relates to new wetting, detergent, emulsifying, and penetrating agents and specifically to abietyl sulphate as such.

This invention has as an object the preparation of new surface active agents. A further object is to prepare these new surface active agents by novel and easily conducted processes which yield products of superior quality. A still further object is to develop capillary active agents which are water-soluble and which greatly increase the speed with which water will wet and penetrate. A still further object is to produce emulsions and to increase the detergent and dispersing action of water solutions. A still further object is to employ these new agents in various technical relations. Other objects will appear hereinafter.

These objects are accomplished by the following invention according to which abietyl alcohol is sulphated by a suitable sulphating agent. The resulting product is converted to the sodium salt. This material when dissolved in water produces a solution which possesses properties as a wetting, detergent, penetrating, and emulsifying agent.

The following examples illustrate but do not limit the invention.

Example 1

The abietyl alcohol used in this experiment was made by reduction of methyl abietate with sodium and alcohol. The abietyl alcohol has an iodine number of 120 and an hydroxyl number of 166.4. 103 grams of abietyl alcohol is warmed and stirred with 20 grams of tri-chloroethylene until a liquid state is achieved. The temperature is held between 30–40° C. while 44 grams of chlorosulphonic acid is dropped in. Two hours are required for the addition. Stirring is continued for 30 minutes and then the reaction mass is drowned in a solution of 40 grams of 50% NaOH and 230 grams of water. The solution is alkaline to phenolphthalein. 58 grams of sodium sulphate is added and the product is dried on a drum drier. 158 grams of product is obtained which has wetting and emulsifying properties.

Example 2

The abietyl alcohol used in this and the following examples has an iodine number of 175 and an hydroxyl number of 190–200. It distills at approximately 200° C. at 2–3 mm. Its refractive index is 1.5363 at 20° C.

25 grams of abietyl alcohol is heated to 45–55° C. and 20 grams of chlorosulphonic acid is added slowly. The temperature is held between 45 and 55° C. The reaction is quite vigorous. The viscous sulphation mass is poured into a solution of 14 grams of 50% NaOH and 100 grams of water. The temperature rises to 60–70° C. A dark brown opaque solution results which possesses wetting and emulsifying properties.

Example 3

190 grams of abietyl alcohol is dissolved in 250 grams of carbon tetrachloride. The temperature is held at 10–15° C. while 137 grams of chlorosulphonic acid is added during the course of 1¾ hours. Agitation is continued for 10 minutes and then the mass is drowned in 150 grams of 50% NaOH, 500 grams of water, and 200 grams of ice. The solution is made neutral to phenolphthalein. A clear brown solution results which possesses wetting and emulsifying properties.

Example 4

Fifteen grams of the abietyl alcohol is dissolved in 100 cubic centimeters of ethyl ether and cooled to 0° C. 6.9 grams of chlorosulphonic acid is dissolved in 10 cubic centimeters of ethyl ether (with cooling in an ice bath) and the chlorosulfonic acid solution is then added to the abietyl alcohol solution with agitation at 0° C. over a 15 minute period. The reaction mass is stirred for 45 minutes at 0° and poured over 200 grams of ice. The mixture is then made just alkaline to phenolphthalein with a 10% sodium hydroxide solution. Two hundred cubic centimeters of water is then added and the ether and water evaporated off. The dry cake is boiled with 200 cubic centimeters of methyl alcohol, and the hot solution is filtered. The filtrate is then diluted with an equal volume of water and extracted with petroleum ether. The aqueous methyl alcohol part is then evaporated to dryness, leaving the sodium abietyl sulphate as a solid. An aqueous solution of this product has excellent wetting and detergent properties.

Example 5

Fifty-two grams of chlorosulphonic acid is dissolved in 160 grams of dry pyridine at 0° to 10° C., allowing the temperature to rise to 30° C. at the end of the reaction. To this is added 100 grams of abietyl alcohol dissolved in 310 grams of dry pyridine. The temperature is held at 30° C. during the addition which requires one hour. The reaction mass is stirred for 30 minutes after the addition is complete and poured over 2 kilograms of ice. The solution is made just alkaline to phenolphthalein with a 10% sodium hydroxide solution and evaporated to dryness under reduced pressure, keeping the temperature below 60° C. The dry residue is boiled with 500 cubic centimeters of methyl alcohol and filtered, and the filtrate is diluted with ½ its volume of water. It is then extracted with petroleum ether and the aqueous alcohol part evaporated to dryness keeping the temperature below 60° C. The sodium abietyl sulphate remains as a solid. An aqueous solution of this product has excellent wetting and emulsifying properties.

Various sulphating and sulphonating agents may be employed without changing the character of the invention. These agents include, among others, sulphuric acid (mono hydrate), acetyl sulphuric acid, sulphur trioxide in various solvents, chlorosulphonic acid alone or in various solvents. The preferred method is the use of chlorosulphonic acid in an ether or pyridine solution.

Likewise, different solvents may be employed in place of carbon tetrachloride, such as trichloroethylene, dichloroethyl ethyl, etc. The preferred solvents are ethyl ether and pyridine.

Other bases besides sodium hydroxide may be used for neutralizing the sulphation product. The potassium, ammonium, ethanolamine, and cyclohexylamine salts of abietyl sulphate are soluble in water, and their solutions are similar to that of the sodium salt. The magnesium and calcium salts are less soluble in water.

The temperature may be varied within wide limits, but in the preferred methods the preferred range is 0–10° C. if ether is used as a solvent, and 20–30° C. if pyridine is used as a solvent. The reaction may be carried out at super-, sub- or atmospheric pressures, the last being the preferred condition.

Any of the usual methods of isolating the finished product may be used, such as evaporation of the solvents, or salting out the sodium salt. The solution may also be used as it is after neutralization without further treatment.

Abietyl sulphate may be used to advantage as a wetting, penetrating, emulsifying, deterging and dispersing agent. Particularly is it of advantage as an emulsifying agent as is shown by the ease with which the carbon tetrachloride, which may be used in its preparation, is emulsified. Its solutions also have excellent wetting properties.

Resort may be had to such modifications and variations as fall within the spirit and scope of the appended claims.

I claim:

1. The process of making abietyl sulphate which comprises sulphating abietyl alcohol.

2. The process of making abietyl sulphate which comprises sulphating abietyl alcohol with chlorosulphonic acid.

3. The process of making abietyl sulphate which comprises reacting a solution of abietyl alcohol in an organic solvent with chlorosulphonic acid.

4. The process of making abietyl sulphate which comprises reacting a solution of abietyl alcohol in a chlorinated aliphatic solvent with chlorosulphonic acid.

5. The process of making abietyl sulphate which comprises reacting a solution of abietyl alcohol in trichloroethylene with chlorosulphonic acid.

6. The process of making abietyl sulphate which comprises reacting a solution of abietyl alcohol in ethyl ether with chlorosulphonic acid.

7. The process of making sodium abietyl sulphate which comprises reacting a solution of abietyl alcohol in ethyl ether with a solution of chlorosulphonic acid in ethyl ether at a temperature of about 0° C., neutralizing the reaction mixture with a sodium hydroxide solution, and extracting a solution of the neutralized product with petroleum ether.

8. The process of making abietyl sulphate which comprises reacting a solution of abietyl alcohol in dry pyridine with chlorosulphonic acid.

9. The process of making sodium abietyl sulphate which comprises reacting a solution of abietyl alcohol in dry pyridine with a solution of chlorosulphonic acid in dry pyridine at a temperature of about 30° C., neutralizing the reaction mixture with a sodium hydroxide solution, and extracting a solution of the neutralized product with petroleum ether.

10. Abietyl sulphate.

11. An alkali metal abietyl sulphate.

12. Sodium abietyl sulphate.

13. The process of making sodium abietyl sulphate which comprises reacting a solution of abietyl alcohol in ethyl ether with a solution of chlorosulphonic acid in ethyl ether at a temperature of about 0° C., neutralizing the reaction mixture with an aqueous solution of sodium hydroxide, evaporating off the ether and water to yield a dry residue containing sodium abietyl sulphate, boiling said dry residue with methyl alcohol, filtering the hot solution obtained in the preceding step, diluting the filtrate thus obtained with water, extracting the aqueous methyl alcohol solution of the product with petroleum ether, and evaporating off the water and methyl alcohol to yield sodium abietyl sulphate as a purified solid.

HOWARD MAURICE PARMELEE.